United States Patent [19]

Stuart

[11] Patent Number: 4,483,052
[45] Date of Patent: Nov. 20, 1984

[54] MACHINE TOOL ATTACHMENT

[75] Inventor: Howard P. Stuart, Tulsa, Okla.

[73] Assignee: Rockwell International Corporation, El Segundo, Calif.

[21] Appl. No.: 305,303

[22] Filed: Sep. 24, 1981

[51] Int. Cl.³ .............................................. B23Q 3/02
[52] U.S. Cl. ......................................... 29/57; 408/71; 409/157; 409/167; 409/172; 409/222
[58] Field of Search ............... 29/26 R, 26 A, 27 C, 29/57; 408/70, 71; 409/157, 164, 167, 168, 172, 174, 221, 222, 223

[56] References Cited

U.S. PATENT DOCUMENTS

| | | | |
|---|---|---|---|
| 1,139,475 | 5/1915 | Becker | 409/164 X |
| 2,646,700 | 7/1953 | Goldberg | 408/70 |
| 2,829,424 | 4/1958 | Brown | 29/57 |
| 3,066,806 | 12/1962 | Lakins et al. | 294/106 X |
| 3,200,680 | 8/1965 | Coffin | 82/2.5 |
| 3,661,050 | 5/1972 | Erikson | 409/157 |
| 3,703,112 | 11/1972 | Selby | 82/2.5 |
| 4,065,988 | 1/1978 | Lohneis et al. | 82/2.7 |
| 4,087,890 | 5/1978 | Ishizuka et al. | 29/27 C |

Primary Examiner—Z. R. Bilinsky
Attorney, Agent, or Firm—Charles T. Silberberg; Howard A. Kenyon

[57] ABSTRACT

A machine tool attachment which provides for material handling, positioning, and clamping during machining and also eliminates the need for custom tool fixtures is described. The machine tool attachment mechanically advances material to be machined through a tubular tail stock and into a head stock. Collets located in the tail stock and head stock automatically power clamp the material and a rotary indexer automatically rotates and indexes the material during the machining operation. Once machining is completed, the material between the head stock and tail stock is further clamped by the attachment and then cut by the machine tool. Remaining material can then be advanced by the attachment and the process repeated. The machine tool attachment interfaces with a numerically controlled machining center which transmits signals to control the functions of the attachment for proper coordination with the machine tool.

10 Claims, 3 Drawing Figures

MACHINE TOOL ATTACHMENT

BACKGROUND OF INVENTION

1. Field of Invention

This invention generally relates to a machine tool attachment. More specifically, this invention relates to a machine tool parts positioner that automatically feeds, clamps, positions and indexes extruded or bar stock material for machining operations.

2. Description of Prior Art

Several machine tools are known that provide automatic feed capabilities as an integral part of the primary machine. One such machine tool is described in U.S. Pat. No. 3,200,680 to Coffin that provides automatic material advance capability for long sections of round, octagon or hexagon shaped bars for an automatic lathe. In Coffin the material rotates during the cutting operation and the cutting tool is fixed, while in the present invention, the material rotates to indexed positions and the cutting tool rotates for the cutting operation.

U.S. Pat. No. 3,703,112 to Selby is a similar type automatic lathe as described by Coffin where the material is positioned for each lathe operation in conjunction with a rotatable turret tool holder. Again, the material rotates while the cutting tool is fixed.

U.S. Pat. No. 4,065,988 by Lohneis, et al., describes an automatic workpiece changer as well as an automatic tool changer in conjunction with a numerically controlled milling machine. The machine has the capability to transfer workpieces from a stationary position to a workpiece spindle for machining operations and subsequently remove the workpieces from the spindle. In addition, the workpieces are pre-cut to a specified length prior to loading in the workpiece holder. This machine, however, can only perform straight line milling and not contour milling as in the present invention.

SUMMARY OF THE INVENTION

It is an object of this invention to provide an attachment for a programmable milling machine with a rotating cutting tool.

It is another object of this invention to provide a material handling, positioning, and clamping mechanism to aid in the machining of parts made from extruded or bar stock material.

It is yet another object of this invention to provide a portable device to aid in the manufacture of a plurality of parts of identical detail.

It is still another object of this invention to eliminate costly custom tooling fixtures, time consuming setups and manual part handling functions when fabricating parts from extruded or bar stock material.

Briefly, in accordance with this invention, there is provided a machine tool attachment for use with a programmable milling machine with a rotating cutting tool. The machine tool attachment comprises rotatable head stock and tail stock housings for holding the material to be machined. A positioning means rotates the head stock and tail stock to sequentially position the material relative to the cutting tool. An advancing means provides for advancing the material into machining position.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only, and are not intended as a definition of the limits of the invention.

While the invention will be described in connection with the preferred embodiment, it will be understood that it is not intended to limit the invention to that embodiment. On the contrary, it is intended to cover all alternatives, modifications, and equivalents that may be included within the spirit and scope of the invention as defined by the appended claims.

DETAILED DESCRIPTION OF THE INVENTION

Figure 1:
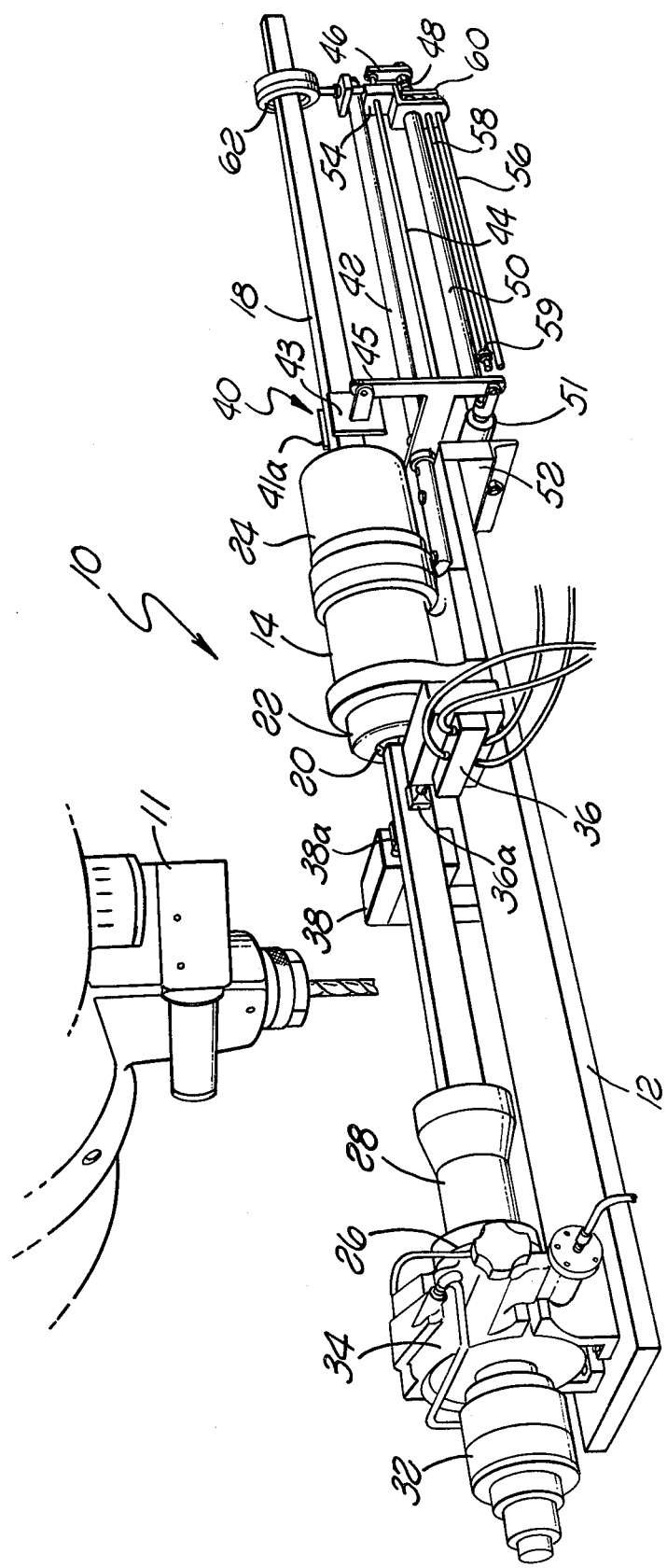
FIG. 1 is a perspective view of a machine tool attachment in accordance with the present invention.
Figure 2A:
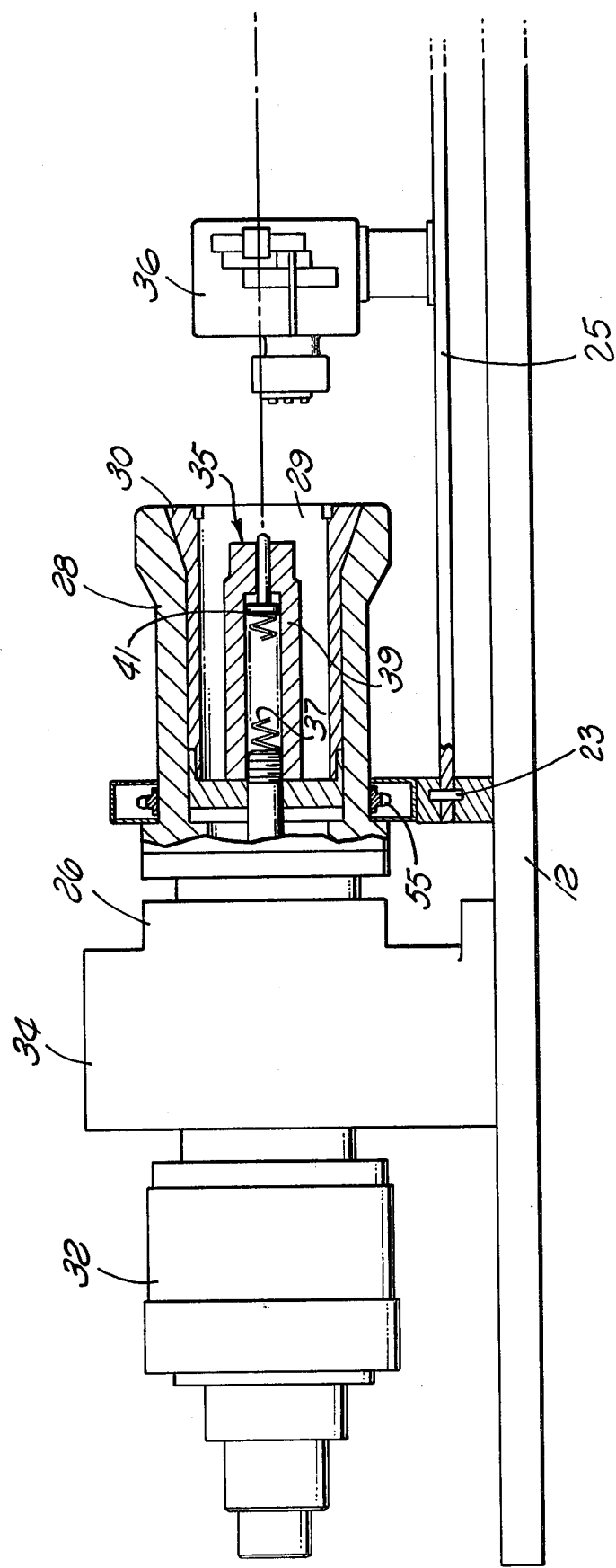
FIGS. 2a and 2b are sideviews of a machine tool attachment with partial sectional views of the head stock and the tail stock.
Figure 2B:
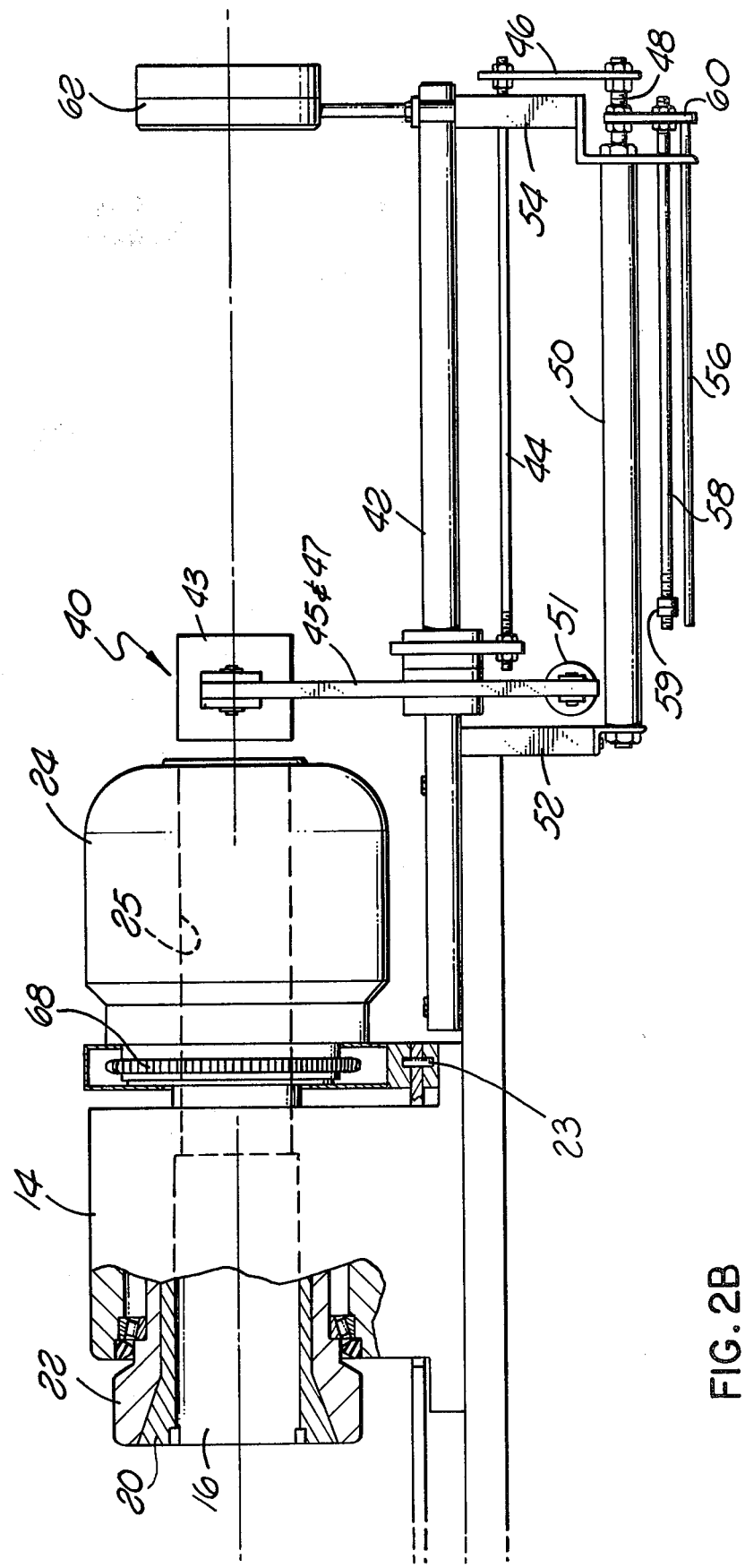

Referring now to FIGS. 1, 2a and 2b of the drawings, there is shown a machine tool attachment generally indicated at 10 according to the present invention. In FIG. 1, a milling machine head 11 is shown in milling position relative to machine tool attachment 10. The machine tool attachment components are mounted on a base plate 12, which can be fitted to a variety of milling machines associated with a numerical control machining center which can supply control signals. Referring again to FIGS. 1, 2a and 2b, a tail stock housing 14 which is mounted to base 12 has a tubular passage 16 wherein material 18 to be milled is advanced. Tail stock collet 20 is positioned inside passage 16 of tail stock collet housing 22 such that tail stock collet 20 is movable longitudinally. Tail stock collet 20 and tail stock collet housing 22 are also rotatable in unison inside tail stock housing 14.

Actuator 24 with a tubular passage 25 therethrough in alignment with passage 16 is mechanically connected in a suitable manner to tail stock collet 20. An insert jaw (not shown) is fitted inside tail stock collet 20 with the internal shape of the insert jaw matching the external shape of the material 18.

Mounted to head stock 26 is rotatable head stock collet housing 28 which has a bore 29. A head stock collet 30 is positioned inside bore 29 of head stock collet housing 28 such that head stock collet 30 is movable longitudinally. A actuator 32 is mechanically connected in a suitable manner to head stock collet 30. An insert jaw (not shown) is fitted inside head stock collet 30 with the internal shape of the insert jaw matching the external shape of the material 18. Located between actuator 32 and head stock collet housing 28 is a rotary indexer 34 which rotates in unison both head stock collet housing 28 and head stock collet 30. Positioned inside bore 29 is a material stub end ejector mechanism 35.

Mechanism 35 uses a spring 37 mounted within a cylinder 39 which biases a piston 41. Side clamp mechanisms 36 and 38 are attached to base plate 12 between tail stock collet 20 and head stock collet 30. A material advance clamp mechanism 40 slides on guide rod 42 while advancing material 18. Material advance clamp 40 is composed of two opposing pads 41a and 43 pivotally mounted at the top end of bars 45 and 47. Bars 45 and 47 which are activated by double acting cylinder 51 rotate around guide rod 42 to move pads 41a and 43 to clamp and release material 18. Connecting rods 44 and 46 mechanically connect guide clamp mechanism 40 to piston 48. Cylinder 50 is connected to base plate 12 by structural elements 52 and to guide rod 42 by structural element 54. Guide rods 56 and 58 which stabilize piston 48 are mechanically connected to piston 48 by link 60. Stop nuts 59 are attached to the end of guide rod 58 to prevent piston override. A material guide 62 is attached to guide rod 42 to provide support to material 18.

The method of use of the machine tool attachment is described hereinafter. Referring to FIGS. 1, 2a and 2b, material 18 is placed by an operator through material guide 62, actuator 24, collet 20 and tail stock insert jaw (not shown). The leading end of the material 18 is inserted into head stock insert jaw (not shown), fitted into the head stock collet 30. Power to the machine tool parts positioner mechanisms is initiated by a control panel (not shown), which also receives signals from the numerical controls of an associated milling machine in order to actuate switching mechanisms (not shown) for sequential operation. Power is then transmitted to head stock actuator 32 and tail stock actuator 24. The actuators 32 and 24 are mechanically linked to collets 30 and 20 which slide longitudinally toward the actuators 32 and 24 respectively and thereby provide clamping power on the respective insert jaws to hold securely material 18. During milling operations, rotary indexer 34 positions the material 18 circumferentially about the material axis upon demand from the milling machine numerical control signals. In the preferred embodiment, indexer 34 rotates head stock collet housing 28. Tail stock collet housing 22 is connected by gears 23 and a drive shaft 25 to head stock collet housing 28 by chain drives 55 and 68. This provides synchronization between the head stock collet 30 and tail stock collet 20 and yields no torsional stress on the material 18 during milling operations. Upon completion of the initial machining operations, clamps 36 and 38 are automatically activated and plungers 36a and 38a respectively are forced against the finished part from both sides which provides stability for the cut-off operation of the milling machine cutter. Upon completion of the cut-off operations, the plungers 36a and 38a of clamps 36 and 38 respectively retract and the finished part drops into a holding bin (not shown). The actuators 32 and 24 release the clamping power by forcing the collets 30 and 20 longitudinally away from respective actuators 32 and 24. The stub end of material 18 is ejected from head stock insert jaws into the holding bin by piston 41 which is biased by spring 37. Upon command, piston 48 of cylinder 50 extends, placing material advance clamp 40 in the aft most position. Material advance clamp 40 is then power activated by cylinder 51, clamping material 18. Upon further command, piston 48 of cylinder 50 retracts pulling material through material guide 62 and pushing material 18 through actuator 24, collet 20 and the tail stock insert jaw. The new leading end of material 18 is inserted into the head stock insert jaw which is fitted into collet 30. The milling operation can then be repeated.

Thus, it is apparent that there has been provided, in accordance with the invention, a machine tool attachment that fully satisfies the objectives, aims, and advantages set forth above. While the invention has been described in conjunction with specific embodiments thereof, it is evident that many alternatives, modifications, and variations will be apparent to those skilled in the art in light of the aforegoing description. Accordingly, it is intended to embrace all such alternatives, modifications, and variations that fall within the spirit and scope of the appended claims.

What is claimed is:

1. A machine tool attachment for positioning material for machining operations, comprising:
   a tail stock housing having a tubular passage therethrough;
   first gripper means for gripping said material in said tail stock housing, said first gripper means coupled for rotation with said tail stock housing, said first gripper means comprising a collet and a connecting power means, said collet being axially moveable within said tubular passage by said power means such that said material can be gripped and released by virtue of the position of said collet within said tubular passage;
   a head stock housing having a bore axially aligned with said tubular passage of said tail stock housing;
   second gripper means for gripping said material in said head stock housing, said second gripper means coupled for rotation with said head stock housing, said second gripper means comprising a collet and a connecting power means, said collet being axially moveable within said bore by said power means such that said material can be gripped and released by virtue of the position of said collet within said bore;
   advancing means for advancing material through said tail stock and into said head stock such that said material is in a machining position;
   positioning means for rotating said head stock and said tail stock to sequentially position said material to perform machining operations, said positioning means including a synchronization means for synchronizing rotation of said head stock and said tail stock such that said head stock and said tail stock rotate in unison and said material is uniformly rotated; and
   resilient ejecting means in said head stock housing for ejecting a material stub after said material is machined.

2. The machine tool attachment of claim 1 wherein said synchronizing means comprises a geared shaft coupled for rotation with said head stock and said tail stock.

3. The machine tool attachment as described in claim 2 wherein said positioning means comprises a powered rotary motor with indexing means to stop rotation at any circumferential point.

4. The machine tool attachment as described in claim 2 also including:
   a material guide axially aligned with said tail stock tubular passage and said head stock bore.

5. The machine tool attachment as described in claim 4 wherein said material is extruded or bar stock material.

6. The machine tool attachment as described in claim 4 wherein each of said collets is fitted with an insert jaw designed to fit said material.

7. The machine tool attachment as described in claims 4 or 6 wherein said advancing means comprises a clamping means for clamping said material and an actuation means for longitudinally moving said clamping means such that said material is advanced.

8. The machine tool attachment of claim 7 wherein said clamping means comprises a guide rod, two opposed clamping members pivotally mounted to said guide rod, and means for simultaneously rotating said clamping members such that said material is either clamped between said clamping members or released from said clamping members, said clamping members being longitudinally moveable along said guide rod for advancing said material.

9. The machine tool attachment of claim 8 wherein said means for simultaneously rotating said clamping members is a double acting piston assembly.

10. The machine tool attachment of claim 4 wherein said actuation means for longitudinally moving said clamping means comprises a piston assembly, whereby movement of the piston of said piston assembly results in the corresponding longitudinal movement of the material.

* * * * *